United States Patent
Zheng et al.

(10) Patent No.: US 8,622,601 B2
(45) Date of Patent: Jan. 7, 2014

(54) BACKLIGHT MODULE AND DISPLAY APPARATUS

(75) Inventors: Weiwei Zheng, Shenzhen (CN); Yicheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 450 days.

(21) Appl. No.: 12/995,591

(22) PCT Filed: Sep. 30, 2010

(86) PCT No.: PCT/CN2010/077552
§ 371 (c)(1),
(2), (4) Date: Dec. 1, 2010

(87) PCT Pub. No.: WO2012/009882
PCT Pub. Date: Jan. 26, 2012

(65) Prior Publication Data
US 2012/0020113 A1    Jan. 26, 2012

(30) Foreign Application Priority Data
Jul. 23, 2010  (CN) .......................... 2010 1 0238182

(51) Int. Cl.
*F21V 7/04*  (2006.01)

(52) U.S. Cl.
USPC ........... 362/612; 362/621; 362/632; 362/97.3

(58) Field of Classification Search
USPC ............... 362/612, 621, 97.3, 631–634, 628, 362/23.09, 23.1, 23.17, 800
See application file for complete search history.

(56) References Cited

U.S. PATENT DOCUMENTS

| | | | |
|---|---|---|---|
| 7,139,048 B2 * | 11/2006 | Han et al. | 349/62 |
| 7,876,393 B2 * | 1/2011 | Tanabe | 349/62 |
| 8,246,232 B2 * | 8/2012 | Huttner et al. | 362/608 |
| 8,251,564 B2 * | 8/2012 | Lin et al. | 362/621 |
| 2005/0068471 A1 | 3/2005 | Aoyagi et al. | |
| 2008/0151142 A1 | 6/2008 | Noba | |

FOREIGN PATENT DOCUMENTS

| | | |
|---|---|---|
| CN | 1612017 A | 5/2005 |
| CN | 200979631 Y | 11/2007 |
| CN | 101460887 A | 6/2009 |
| CN | 101556402 A | 10/2009 |
| JP | 2003187622 A | 7/2003 |

* cited by examiner

*Primary Examiner* — Bao Q Truong
(74) *Attorney, Agent, or Firm* — Ditthavong Mori & Steiner, P.C.

(57) ABSTRACT

The present invention provides a backlight module and a display apparatus. The backlight module comprises a light guide plate, a base, a first light emitting diode and a second light emitting diode. The base is disposed at one side of the light guide plate. The first light emitting diode is disposed on a first arrangement surface of the base. The second light emitting diode is disposed on the second arrangement surface of the base. The distance between the first light emitting diode and the bottom surface is longer than the distance between the second light emitting diode and the bottom surface. The present invention can improve color shifting defect and coupling effect of the light emitting diodes.

12 Claims, 4 Drawing Sheets

BACKLIGHT MODULE AND DISPLAY APPARATUS

FIELD OF THE INVENTION

The present invention relates to a backlight module and a display apparatus, and more particularly to a backlight module and a display apparatus capable of improving color shifting defect.

BACKGROUND OF THE INVENTION

Liquid crystal displays (LCDs) have been widely applied in electrical products. Currently, most of LCDs are backlight type LCDs, and comprise a liquid crystal panel and a backlight module. According to the position of the light sources, the backlight module can be classified into a side-light type or a direct-light type, in order to provide LCDs with backlight sources.

Light emitting diodes (LEDs) have several beneficial characteristics, including low electrical power consumption, low heat generation, long operational life, small volume, good impact resistance, fast response and excellent stability for emitting color light with stable wavelengths. These characteristics have made the LEDs suitable for light sources of the backlight module.

However, the LEDs with different colors have different luminous efficiency. For example, the luminous efficiency of a normal green LED is lower than the luminous efficiency of a red or blue LED. Therefore, when mixing the light of the LEDs with different colors to form a white light, a color shifting defect is susceptible to occur.

For improving the above-mentioned detect, an improving method is to add the number of LEDs with lower luminous efficiency, such as to add the number of green LEDs. However, this method is susceptible to increase the cost and heat of the LEDs.

Another improving method is to charge the arrangement of the LEDs. For example, the green LED is disposed close to a light output surface of a light guide plate (i.e. the upper surface of the light guide plate). However, this method still can not sufficiently improve the color shifting defect.

As a result, it is necessary to provide a backlight module and a display apparatus to solve the problems existing in the conventional technologies, as described above.

SUMMARY OF THE INVENTION

A primary object of the present invention is to provide a backlight module, wherein the backlight module comprises:
a light guide plate;
a base disposed at one side of the light guide plate, wherein the base has a bottom surface, a first arrangement surface and a second arrangement surface, and the first arrangement surface and the second arrangement surface are opposite to the bottom surface;
a first light emitting diode disposed on the first arrangement surface of the base; and
a second light emitting diode disposed on the second arrangement surface of the base, wherein the luminous efficiency of the first light emitting diode is lower than the luminous efficiency of the second light emitting diode, and the distance between the first light emitting diode and the bottom surface is longer than the distance between the second light emitting diode and the bottom surface.

A secondary object of the present invention is to provide a display apparatus, wherein the display apparatus comprises:
a display panel; and
a backlight module comprising:
a light guide plate;
a base disposed at one side of the light guide plate, wherein the base has a bottom surface, a first arrangement surface and a second arrangement surface, and the first arrangement surface and the second arrangement surface are opposite to the bottom surface;
a first light emitting diode disposed on the first arrangement surface of the base; and
a second light emitting diode disposed on the second arrangement surface of the base, wherein the luminous efficiency of the first light emitting diode is lower than the luminous efficiency of the second light emitting diode, and the distance between the first light emitting diode and the bottom surface is longer than the distance between the second light emitting diode and the bottom surface.

In one embodiment of the present invention, the backlight module further comprises a third second light emitting diode disposed on a third arrangement surface of the base, wherein the luminous efficiency of the first light emitting diode is lower than the third light emitting diode, and the distance between the first light emitting diode and the bottom surface is longer than the distance between the third light emitting diode and the bottom surface.

In one embodiment of the present invention, the first light emitting diode is a green light emitting diode, and the second light emitting diode is a red light emitting diode or a blue light emitting diode.

In one embodiment of the present invention, the base is made of metal material with high thermal conductivity.

In one embodiment of the present invention, the base has a projection portion, and the first arrangement surface is formed on the top surface of the projection portion, and the second arrangement surface is formed on one side of the projection portion.

In one embodiment of the present invention, the base has a projection portion, and the first arrangement surface is formed on the top surface of the projection portion, and the second arrangement surface is formed on a side wall of the projection portion.

In one embodiment of the present invention, the light guide plate has a light input side surface which is a plane surface.

In one embodiment of the present invention, the light guide plate has a light input side surface which is a U-shaped concave portion, a V-shaped concave portion or an arc concave portion structure.

In one embodiment of the present invention, the radius of curvature (r) of the arc concave portion structure is based on an Equation:

$$r=((h/2)^2+(r-d+h/2 \tan \theta)^2)^{0.5};$$

wherein h is represented as the thickness of the light guide plate, and d is represented as the distance between the first light emitting diode and the light input side surface, and the light-source visual angle of the first light emitting diode is 2θ.

The backlight module and the display apparatus of the present invention can adjust the coupling distance between the light emitting diodes with different colors and the light guide plate according to the luminous efficiency of the light emitting diodes for compensating the luminous intensity of light emitting diode with lower luminous efficiency, and thus the color shifting defect of the backlight module can be improved. In comparison with the conventional method of improving color shifting defect, the backlight module of the present invention can use fewer light emitting diodes to achieve a uniform color light, thereby reducing unnecessary cost and energy consumption. Furthermore, the backlight module of the present invention can improve the coupling effect of the light emitting diodes by the design of the light guide plate.

The structure and the technical means adopted by the present invention to achieve the above and other objects can be best understood by referring to the following detailed description of the preferred embodiments and the accompanying drawings:

DETAILED DESCRIPTION OF THE PREFERRED EMBODIMENTS

Figure 1:
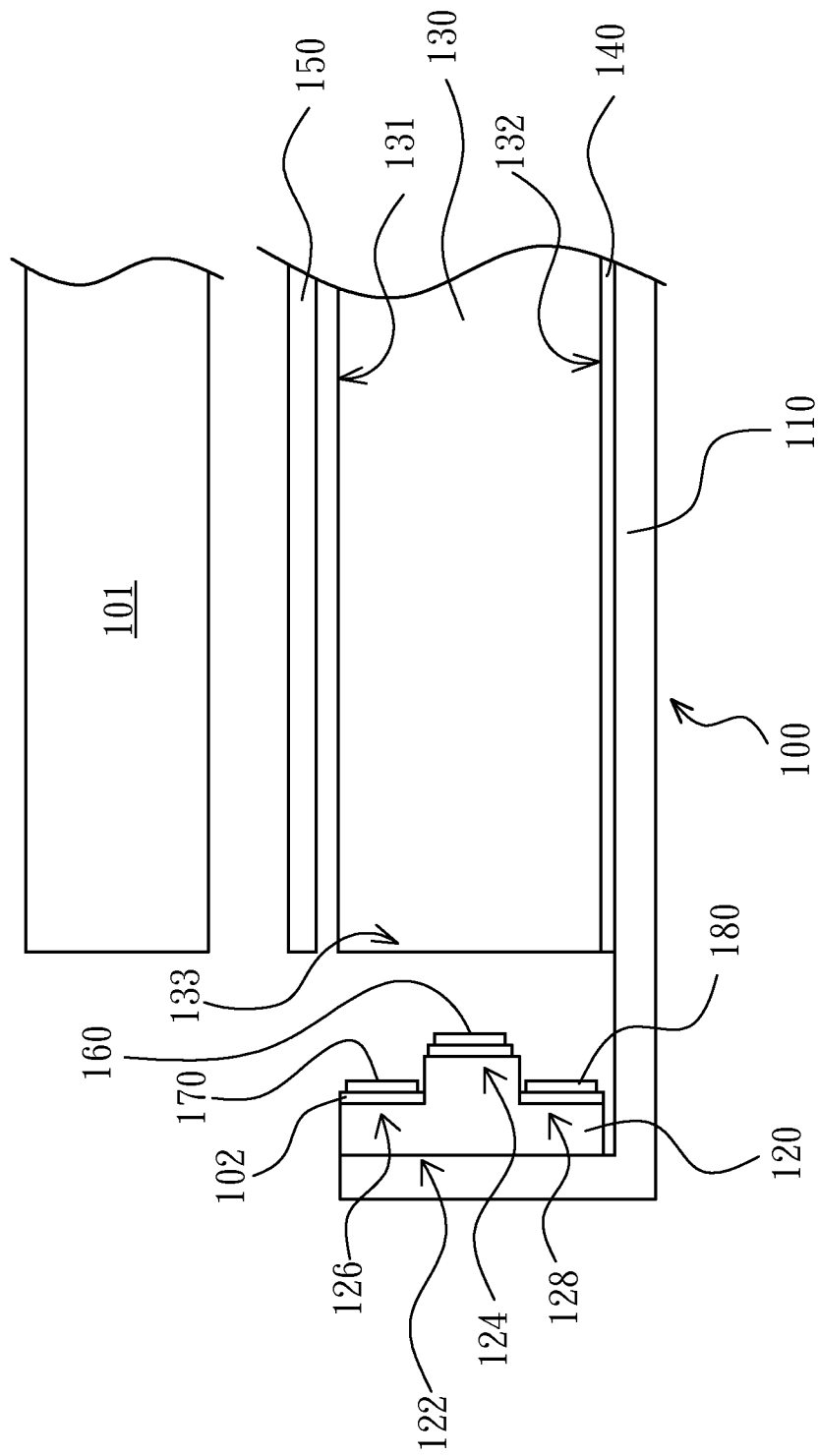
FIG. 1 is a partially cross-sectional view showing a backlight module and a display panel according to a first embodiment of the present invention.

The following embodiments are exemplified by referring to the accompanying drawings, for describing specific embodiments implemented by the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, like reference numerals indicate like components or items.

Referring to FIG. 1, a partially cross-sectional view showing a backlight module and a display panel according to a first embodiment of the present invention is illustrated. The backlight module 100 of the present embodiment may be for example an edge-lighting type backlight module and disposed opposite to a display panel 101 (such as a liquid crystal display panel), thereby forming a display apparatus (such as an LCD apparatus). The backlight module 100 may comprise a back bezel 110, a base 120, a light guide plate 130, a reflective layer 140, optical films 150, a first light emitting diode 160, a second light emitting diode and a third light emitting diode 180. The back bezel 110 may be made of an opaque material, such as plastic, metal or any combination material thereof. The base 120, the light guide plate 130, the reflective layer 140 and the optical films 150 are carried on the back bezel 110. The base 120 is disposed at one side or both opposite sides of the light guide plate 130 for arranging the light emitting diodes 160, 170 and 180. The light emitting diodes 160, 170 and 180 can laterally emit light into the light guide plate 130, and the light guide plate 130 guides light to output. The reflective layer 140 is disposed on the bottom of the light guide plate 130 for reflecting light emitted thereto. The optical films 150 are disposed on the light guide plate 130 for optical improvement.

Figure 2:
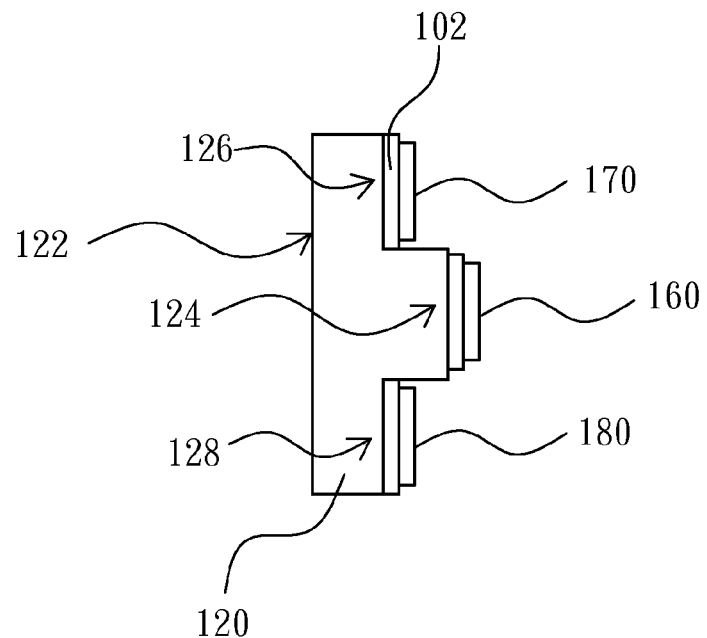
FIG. 2 is a cross-sectional view showing the base and the light emitting diodes according to a first embodiment of the present invention.

Referring to FIG. 2, a cross-sectional view showing the base and the light emitting diodes according to a first embodiment of the present invention is illustrated. The base 120 of the present embodiment is configured to arrange the light emitting diodes 160, 170 and 180 at one side or both opposite sides of the light guide plate 130. The base 120 is preferably made of metal material with high thermal conductivity for increasing the heat dissipation efficiency thereof, wherein the metal material is for example Ag, Cu, Cu alloy, Cu—Ag alloy, Al, Al alloy or any alloy thereof, and the base 120 is fabricated by the method of extrusion molding, stamping, cutting, casting, machining, compression molding or forging. The base 120 may have a bottom surface 122, a first arrangement surface 124, a second arrangement surface 126 and a third arrangement surface 128. The bottom surface 122 of the base 120 is opposite to the light guide plate 130. The arrangement surfaces 124, 126 and 128 are opposite to the bottom surface 122 and face to the light guide plate 130 for arranging the light emitting diodes 160, 170 and 180. The first arrangement surface 124 is configured to arrange the first light emitting diode 160, the second arrangement surface 126 is configured to arrange the second light emitting diode 170, and the third arrangement surface 128 is configured to arrange the third light emitting diode 180, wherein the distance between the first arrangement surface 124 and the bottom surface 122 is longer than the distance between the second arrangement surface 126 and the bottom surface 122, and longer than the distance between the third arrangement surface 128 and the bottom surface 122. In this manner, the first light emitting diode 160 disposed on the first arrangement surface 124 is closer to the light guide plate 130 than the second light emitting diode 170 and third light emitting diode 180. In the embodiment, the base 120 may be an elongated base with a T-shaped cross-section having a projection portion. The first arrangement surface 124 may be formed on the top surface of the projection portion, and the second and the third arrangement surface 126 and 128 may be formed on both sides of the projection portion, respectively.

Referring to FIG. 1 again, the light guide plate 130 of the present embodiment is disposed on the back bezel 110 and at one side of the base 120 for guiding the light of the light emitting diodes 160, 170 and 180. The light guide plate 130 may be made by the method of injection molding, and the material thereof may be photo-curable resin, polymethylmethacrylate (PMMA) or polycarbonate (PC). The light guide plate 130 may include a light output surface 131, a light reflection surface 132 and a light input side surface 133. The light output surface 131 is formed on a front side of the light guide plate 130 for allowing light to be emitted from the light guide plate 130 toward the liquid crystal display panel 101. The light reflection surface 132 is positioned on the bottom surface of the light guide plate 130 and opposite to the light output surface 131. The light input side surface 133 of the light guide plate 130 is formed on one side or two opposite sides of the light guide plate 130 and corresponding to the light emitting diodes 160, 170 and 180 disposed on the base 120 for allowing the light emitted by the light emitting diodes 160, 170 and 180 to be inputted in the light guide plate 130. The light input side surface 133 may have V-cut structures, S-shaped structures or a rough surface structure (not shown) to raise light incidence efficiency and light coupling efficiency. In the embodiment, the light input side surface 133 may be a plane surface vertical to the light reflection surface 132.

Referring to FIG. 1 again, the light guide plate 130 of the present embodiment may have light guiding structures formed thereon to guide the light emitted by the light source 120 to emit out of the light output surface 131, and preferably to emit toward the front of the light output surface 131 (to output the light toward the front thereof). The light guiding structures of the light guide plate 130 may be a plurality of continuous V-cut structures (formed by a method such as injection molding or micro-cutting process), a frosted surface (formed by a method such as sanding process), or a plurality of scattered patterns (formed by a method such as printing, laser precision machining or a method for integrally forming), thereby guiding the light inputted from the light input side surface 133 into the light guide plate 130 to be outputted from the light output surface 131.

It is worth mentioned that the light output surface 131 of the light guide plate 130 can also have a frosted surface or a plurality of scattered patterns to uniform light outputted from the light guide plate 130, and thus the phenomenon of Mura is reduced.

Referring to FIG. 1 again, the reflective layer 140 of the present embodiment may be a reflective film or a reflective coated layer with a high reflective material, such as Ag, Al, Au, Cr, Cu, In, Ir, Ni, Pt, Re, Rh, Sn, Ta, W, Mn, alloy of any combination thereof, white reflective paint with etiolation-resistant and heat-resistant properties or any combination thereof for reflecting light. It is worth mentioned that the high reflective material can also be coated on the light reflection surface 132 of the light guide plate 130 to reflect the incident light, hence replacing or omitting the reflective layer 140.

Referring to FIG. 1 again, the optical films 150 of the present embodiment may be a diffuser, a prism sheet, a turning prism sheet, a brightness enhancement film (BEF), a dual brightness enhancement film (DBEF), a diffused reflective polarizer film (DRPF) or any combination thereof disposed above the light output surface 131 of the light guide plate 130 for optical improvement.

Referring to FIG. 1 again, the light emitting diodes 160, 170 and 180 of the present embodiment are disposed on the arrangement surface 124, 126 and 128, respectively, wherein the luminous efficiency of the first light emitting diode 160 is lower than the luminous efficiency of the second light emitting diode 170 and lower than the luminous efficiency of the third light emitting diode 180. For example, the first light emitting diode 160 is a green light emitting diode, and the second light emitting diode 170 and the third light emitting diode 180 may be a red light emitting diode and a blue light emitting diode, respectively. In the present embodiment, since the distance between the first arrangement surface 124 and the bottom surface 122 is longer than the distance between the second or the third arrangement surface 126, 128 and the bottom surface 122, the distance between the first light emitting diode 160 and the bottom surface 122 is longer than the distance between the second or the third light emitting diode 170, 180 and the bottom surface 122. Furthermore, the first light emitting diode 160 is preferably disposed between the second light emitting diode 170 and the third light emitting diode 180, i.e. the first light emitting diode 160 is preferably positioned to the middle position of the light guide plate 130.

When the light emitting diodes 160, 170 and 180 are arranged on the arrangement surface 124, 126 and 128 of the base 120, a plurality of the light emitting diodes 160, 170 and 180 can be disposed on circuit boards 102 firstly to form light bars, and then the light bars having the light emitting diodes 160, 170 and 180 are attached to the arrangement surface 124, 126 and 128 of the base 120, respectively.

Therefore, when the light emitting diodes 160, 170 and 180 disposed on the base 120 emit light toward the light guide plate 130, the distance between the first light emitting diode 160 with lower luminous efficiency and the light guide plate 130 is shorter than the distance between the second or third light emitting diode 170, 180 and the light guide plate 130, and thus the coupling efficiency of the first light emitting diode 160 can be raised for compensating the low luminous efficiency of the first light emitting diode 160. Accordingly, the different color light emitted by the light emitting diodes 160, 170 and 180 toward the light guide plate 130 can have substantially identical luminous intensity, thereby greatly improving the color shifting defect.

Figure 3:
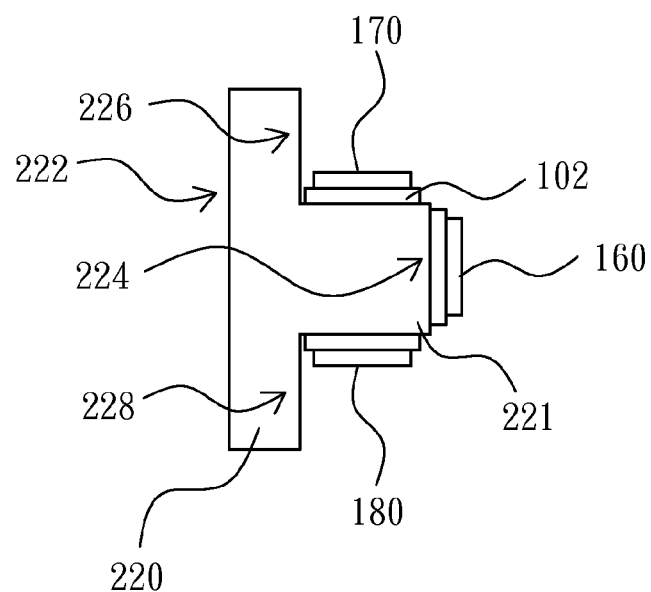
FIG. 3 is a cross-sectional view showing a base and light emitting diodes according to a second embodiment of the present invention.

Referring to FIG. 3, a cross-sectional view showing a base and light emitting diodes according to a second embodiment of the present invention is illustrated. Only the difference between the present embodiment and the first embodiment are described hereinafter, and the similar construction there between is not stated in detail herein. In comparison with the first embodiment, the base 220 of the second embodiment has a projection portion 221, a bottom surface 222, a first arrangement surface 224, a second arrangement surface 226 and a third arrangement surface 228. The first arrangement surface 224 is formed on the top surface of the projection portion, and the second arrangement surface 226 and the third arrangement surface 228 are formed on both side walls of the projection portion 221, respectively. At this time, the light emitting diodes 160, 170 and 180 can be disposed on circuit boards 102 firstly. Subsequently, the circuit boards 102 are assembled on the arrangement surface 224, 226 and 228 formed on the projection portion 221, respectively. The light emitting diodes 170 and 180 are side view LEDs.

Figure 4A:
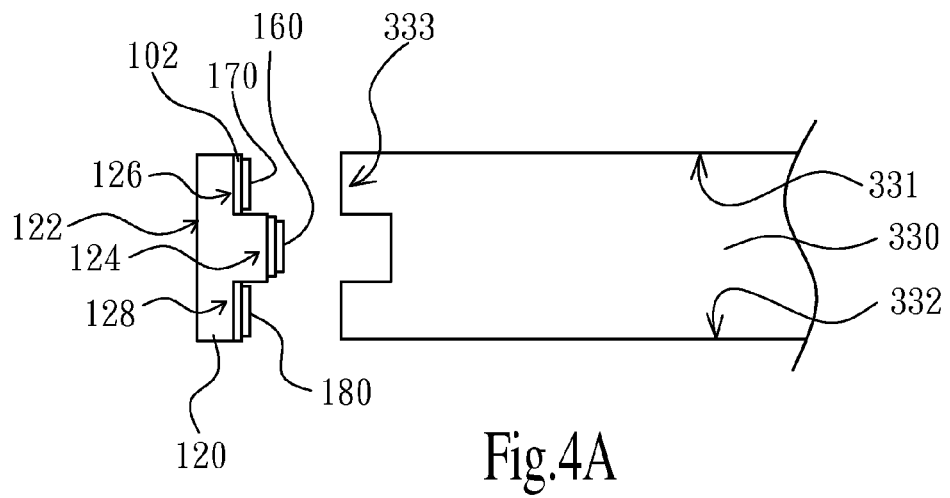
FIG. 4A through FIG. 4C are partially cross-sectional views showing a backlight module according to a third embodiment of the present invention.
Figure 4B:
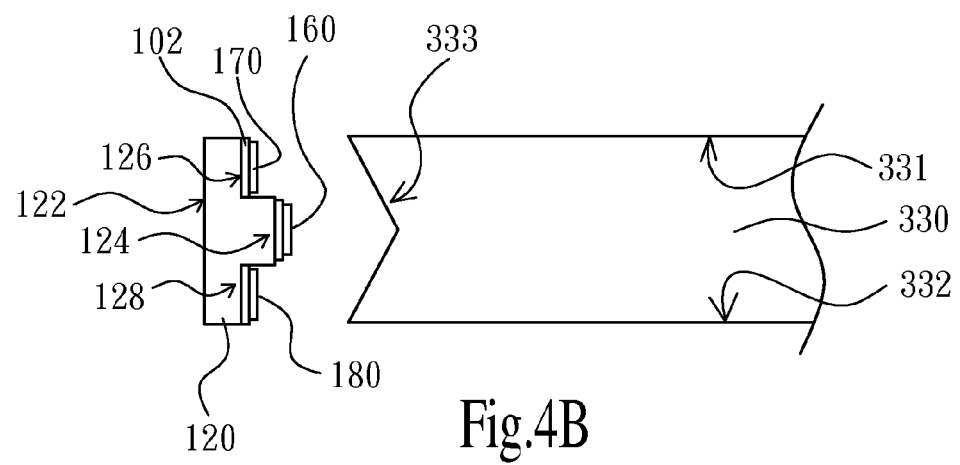
Figure 4C:
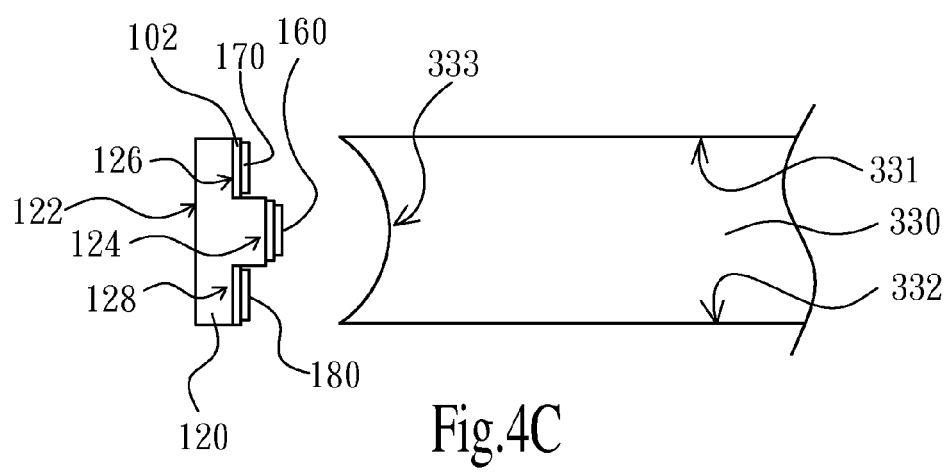

Referring to FIG. 4A through FIG. 4C, partially cross-sectional views showing a backlight module according to a third embodiment of the present invention are illustrated. Only the difference between the present embodiment and the first embodiment are described hereinafter, and the similar construction there between is not stated in detail herein. In comparison with the first embodiment, the light guide plate 330 of the third embodiment include a light output surface 331, a light reflection surface 332 and a light input side surface 333, wherein the light input side surface 333 can be concave inward the light guide plate 330 corresponding to the first light emitting diode 160, thereby forming a U-shaped concave portion (referring to FIG. 4A), a V-shaped concave portion (referring to FIG. 4B) or an arc concave portion (referring to FIG. 4C) to further improve the coupling efficiency of the light emitting diodes 160, 170 and 180. The depth of the light input side surface 333 curved inward the light guide plate 330 is preferably identical to the distance between the first arrangement surface 224 and the second or the third arrangement surface 126 or 128.

Figure 5:
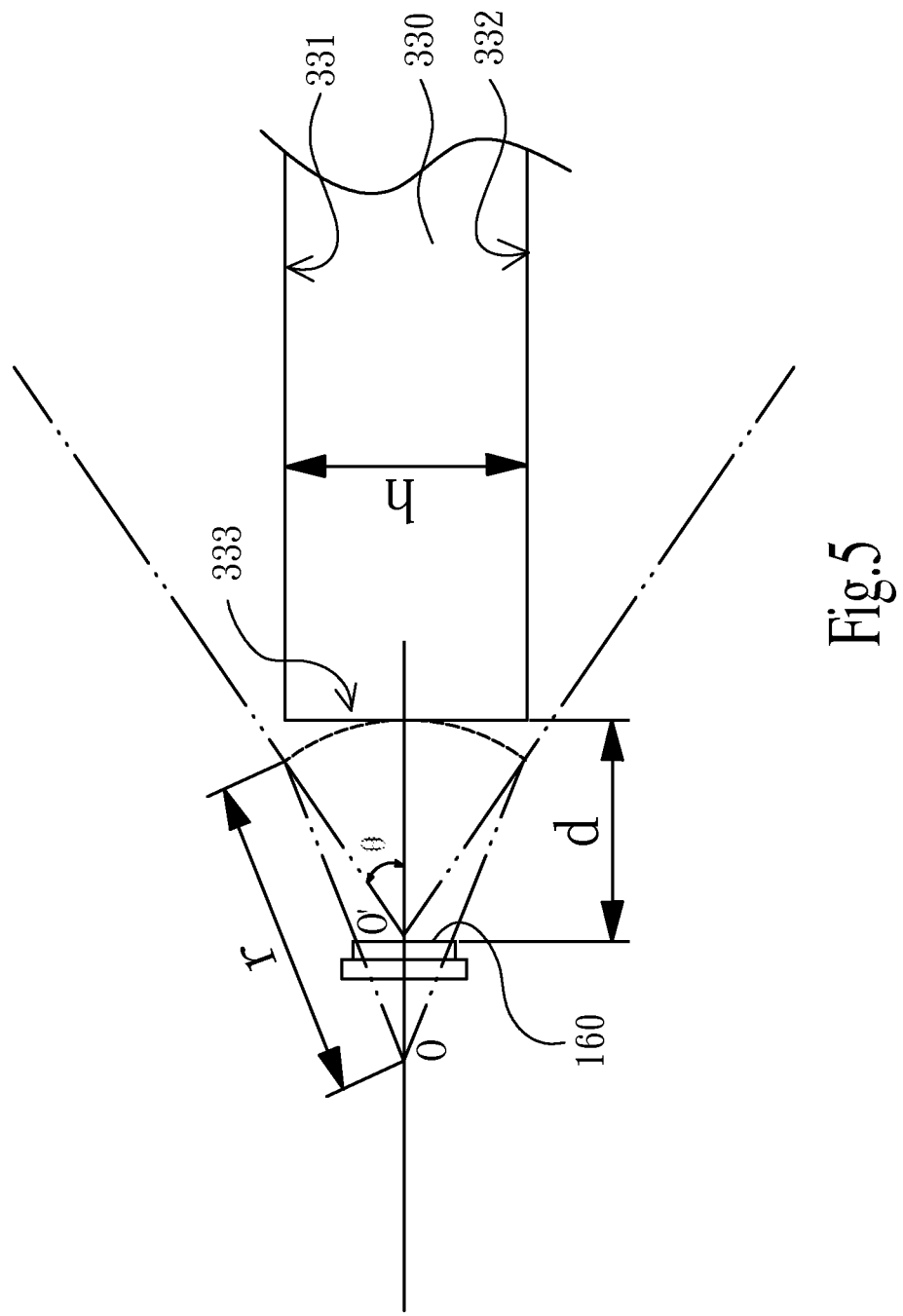
FIG. 5 is a partially cross-sectional view showing a light guide plate according to a third embodiment of the present invention.

Referring to FIG. 5, a partially cross-sectional view showing a light guide plate according to a third embodiment of the present invention is illustrated. In the embodiment, when the light input side surface 333 of the light guide plate 330 is, for example, the arc concave portion structure, the curvature radius r of the arc concave portion structure may be based on the following Equation (1):

$$r = ((h/2)^2 + (r - d + h/2 \tan \theta)^2)^{0.5} \quad (1)$$

wherein, referring to FIG. 5 again, h is represented as the thickness of the light guide plate 330, and d is represented as the distance between the first light emitting diode 160 and the light input side surface 333, and the light-source visual angle of the first light emitting diode 160 is 2θ. Therefore, the arc curvature ρ may be based on the following Equation (2):

$$\rho = 1/r = 1/((h/2)^2 + (r - d + h/2 \tan \theta)^2)^{0.5} \quad (2)$$

As described above, the backlight module and the display apparatus of the present invention can be based on the luminous efficiency of the light emitting diodes with different colors to adjust the arrangement position thereof, i.e. the coupling distance between the light emitting diodes and the light guide plate may be changed according to the luminous efficiency of the light emitting diodes for compensating the luminous intensity of light emitting diode with lower luminous efficiency (such as green light emitting diode). Therefore, the different color light emitted by the light emitting diodes toward the light guide plate can have substantially identical luminous intensity thereby greatly improving the color shifting defect of the backlight module. Accordingly, for example, the light emitted by R-G-B light emitting diodes can be mixed to form a uniform white light for improving the mixing effect of the light emitting diodes. Furthermore, In comparison with the conventional method of improving color shifting defect by adding the number of the light emitting diodes with lower luminous efficiency, the backlight module of the present invention can prevent from adding the number of the light emitting diodes with lower luminous efficiency, hence reducing unnecessary cost and energy consumption.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A display apparatus, characterized in that: the display apparatus comprises:
a display panel; and
a backlight module comprising:
a light guide plate;
a base disposed at one side of the light guide plate, wherein the base has a bottom surface, a first arrangement surface and a second arrangement surface, and the first arrangement surface and the second arrangement surface are opposite to the bottom surface;
a first light emitting diode disposed on the first arrangement surface of the base;
a second light emitting diode disposed on the second arrangement surface of the base, wherein the luminous efficiency of the first light emitting diode is lower than the luminous efficiency of the second light emitting diode, and the distance between the first light emitting diode and the bottom surface is longer than the distance between the second light emitting diode and the bottom surface; and
a third light emitting diode disposed on a third arrangement surface of the base, wherein the luminous efficiency of the first light emitting diode is lower than the third light emitting diode, and the distance between the first light emitting diode and the bottom surface is longer than the distance between the third light emitting diode and the bottom surface.

2. The display apparatus according to claim 1, characterized in that: the first light emitting diode is a green light emitting diode, and the second light emitting diode is a red light emitting diode or a blue light emitting diode.

3. The display apparatus according to claim 1, characterized in that: the base is made of metal material with high thermal conductivity.

4. The display apparatus according to claim 1, characterized in that: the base has a projection portion, and the first arrangement surface is formed on the top surface of the projection portion, and the second arrangement surface is formed on one side or a side wall of the projection portion.

5. The display apparatus according to claim 1, characterized in that: the light guide plate has a light input side surface which is a plane surface, a U-shaped concave portion, a V-shaped concave portion or an arc concave portion structure.

6. The display apparatus according to claim 5, characterized in that: the radius of curvature (r) of the arc concave portion structure is based on an Equation:

$$r=((h/2)^2+(r-d+h/2\tan\theta)^2)^{0.5};$$

wherein h is represented as the thickness of the light guide plate, and d is represented as the distance between the first light emitting diode and the light input side surface, and the light-source visual angle of the first light emitting diode is $2\theta$.

7. A backlight module, characterized in that: the backlight module comprises:
a light guide plate;
a base disposed at one side of the light guide plate, wherein the base has a bottom surface, a first arrangement surface and a second arrangement surface, and the first arrangement surface and the second arrangement surface are opposite to the bottom surface;
a first light emitting diode disposed on the first arrangement surface of the base;
a second light emitting diode disposed on the second arrangement surface of the base, wherein the luminous efficiency of the first light emitting diode is lower than the luminous efficiency of the second light emitting diode, and the distance between the first light emitting diode and the bottom surface is longer than the distance between the second light emitting diode and the bottom surface; and
a third light emitting diode disposed on a third arrangement surface of the base, wherein the luminous efficiency of the first light emitting diode is lower than the third light emitting diode, and the distance between the first light emitting diode and the bottom surface is longer than the distance between the third light emitting diode and the bottom surface.

8. The backlight module according to claim 7, characterized in that: the first light emitting diode is a green light emitting diode, and the second light emitting diode is a red light emitting diode or a blue light emitting diode.

9. The backlight module according to claim 7, characterized in that: the base is made of metal material with high thermal conductivity.

10. The backlight module according to claim 7, characterized in that: the base has a projection portion, and the first arrangement surface is formed on the top surface of the projection portion, and the second arrangement surface is formed on one side or a side wall of the projection portion.

11. The backlight module according to claim 7, characterized in that: the light guide plate has a light input side surface which is a plane surface, a U-shaped concave portion, a V-shaped concave portion or an arc concave portion structure.

12. The backlight module according to claim 11, characterized in that: the radius of curvature (r) of the arc concave portion structure is based on an Equation:

$$r=((h/2)^2+(r-d+h/2\tan\theta)^2)^{0.5};$$

wherein h is represented as the thickness of the light guide plate, and d is represented as the distance between the first light emitting diode and the light input side surface, and the light-source visual angle of the first light emitting diode is 2θ.

* * * * *